United States Patent
Zhang et al.

(10) Patent No.: US 12,092,920 B2
(45) Date of Patent: Sep. 17, 2024

(54) DISPLAY DEVICE

(71) Applicants: HEFEI BOE DISPLAY TECHNOLOGY CO., LTD., Anhui (CN); BOE Technology Group Co., Ltd., Beijing (CN)

(72) Inventors: Lin Zhang, Beijing (CN); Yanping Liao, Beijing (CN); Lei Guo, Beijing (CN); Ke Dai, Beijing (CN); Li Tian, Beijing (CN)

(73) Assignees: HEFEI BOE DISPLAY TECHNOLOGY CO., LTD., Anhui (CN); BOE Technology Group Co., Ltd., Beijing (CN)

( * ) Notice: Subject to any disclaimer, the term of this patent is extended or adjusted under 35 U.S.C. 154(b) by 41 days.

(21) Appl. No.: 17/758,337

(22) PCT Filed: Aug. 4, 2021

(86) PCT No.: PCT/CN2021/110671
§ 371 (c)(1),
(2) Date: Jul. 1, 2022

(87) PCT Pub. No.: WO2022/062698
PCT Pub. Date: Mar. 31, 2022

(65) Prior Publication Data
US 2023/0038437 A1 Feb. 9, 2023

(30) Foreign Application Priority Data
Sep. 28, 2020 (CN) .......................... 202011044487.5

(51) Int. Cl.
*G02F 1/1335* (2006.01)
*G02F 1/1347* (2006.01)
*G02F 1/1362* (2006.01)

(52) U.S. Cl.
CPC .. *G02F 1/133528* (2013.01); *G02F 1/133502* (2013.01); *G02F 1/1347* (2013.01);
(Continued)

(58) Field of Classification Search
CPC ......... G02F 1/133528; G02F 1/133531; B29D 11/00644; B32B 2307/42; G02B 5/3025
See application file for complete search history.

(56) References Cited

U.S. PATENT DOCUMENTS 10,642,094 B2   5/2020   Chen et al.
2005/0141091 A1 6/2005   Maruta et al.
(Continued)

FOREIGN PATENT DOCUMENTS

CN       1637588 A     7/2005
CN     102213876 A    10/2011
(Continued)

OTHER PUBLICATIONS

Haba, English translation of WO-2011162184-A1 (Year: 2011).*
International Search Report, mailed Oct. 19, 2021, from PCT/CN2021/110671.

*Primary Examiner* — Jonathan Y Jung
(74) *Attorney, Agent, or Firm* — Workman Nydegger

(57) ABSTRACT

The present disclosure provides a display device. The display device includes: a liquid crystal display panel; a liquid crystal light control panel located on the light incident side of the liquid crystal display panel; and at least two haze layers located on the light emitting side of the liquid crystal display panel.

15 Claims, 7 Drawing Sheets

(52) U.S. Cl.
CPC .... *G02F 1/136286* (2013.01); *G02F 2201/50* (2013.01); *G02F 2202/28* (2013.01)

(56) References Cited

U.S. PATENT DOCUMENTS

| | | | | |
|---|---|---|---|---|
| 2008/0213511 A1* | 9/2008 | Ikeda | ................... | G02B 5/3083 |
| | | | | 428/1.31 |
| 2009/0147186 A1* | 6/2009 | Nakai | ................ | G02F 1/13471 |
| | | | | 345/89 |
| 2011/0261268 A1 | 10/2011 | Nakai et al. | | |
| 2013/0176619 A1 | 7/2013 | Hoshino et al. | | |
| 2013/0216805 A1* | 8/2013 | Yasui | ....................... | B05D 5/10 |
| | | | | 359/483.01 |
| 2015/0153579 A1 | 6/2015 | Hoshino et al. | | |
| 2017/0082895 A1 | 3/2017 | Sakai et al. | | |
| 2019/0113667 A1* | 4/2019 | Ito | ........................ | C09K 19/30 |

FOREIGN PATENT DOCUMENTS

| | | | |
|---|---|---|---|
| CN | 103200411 A | 7/2013 | |
| CN | 105842906 A | 8/2016 | |
| CN | 106133587 A | 11/2016 | |
| CN | 106932952 A | 7/2017 | |
| CN | 110596947 A | 12/2019 | |
| CN | 110646976 A | 1/2020 | |
| CN | 111176010 A | 5/2020 | |
| CN | 213182252 U | 5/2021 | |
| JP | 2002048912 A | 2/2002 | |
| TW | 201213886 A | 4/2012 | |
| WO | WO-2011162184 A1 * | 12/2011 | ........... G02B 5/0247 |

\* cited by examiner

DISPLAY DEVICE

CROSS REFERENCE TO RELATED APPLICATIONS

The present application is a National Stage of International Application No. PCT/CN2021/110671, filed Aug. 4, 2021, which claims the priority of the Chinese Patent Application No. 202011044487.5, filed to the China National Intellectual Property Administration on Sep. 28, 2020, and entitled "DISPLAY DEVICE", the entire contents of which are incorporated herein by reference.

FIELD

The present disclosure relates to the technical field of display, in particular to a display device.

BACKGROUND

Liquid crystals displays (LCDs) draw attention to the industry due to advantages of small size, low power consumption, no radiation and the like, and are widely applied in fields such as mobile phones, onboard equipment, displays, televisions and public displays. However, a contrast ratio of an LCD panel is only several thousand, and a display effect of the LCD panel cannot compete with that of OLED products. In order to increase the contrast ratio of the LCD products, a layer of liquid crystal display panel is arranged on a single-layer liquid crystal display panel again to be as a light control panel, however, a double-layer liquid crystal panel is prone to generating moire, and affecting the display effect.

SUMMARY

An embodiment of the present disclosure provides a display device, including:
a liquid crystal display panel;
a liquid crystal light control panel, on a light incident side of the liquid crystal display panel; and
at least two haze layers, on a light emitting side of the liquid crystal display panel.

In some embodiments, the display device further includes:
a polarizer, on the light emitting side of the liquid crystal display panel;
the polarizer includes:
a first protection layer;
a second protection layer, disposed opposite to the first protection layer;
a polarization layer, between the first protection layer and the second protection layer;
a pressure-sensitive adhesive layer, disposed on a side of the first protection layer facing away from the polarization layer; and
at least one of the at least two haze layers is disposed on a side of the polarization layer facing away from the liquid crystal display panel.

In some embodiments, wherein at least one of the at least two haze layers is one of:
disposed on a side of the second protection layer facing away from the polarization layer;
disposed between the second protection layer and the polarization layer;
disposed between the first protection layer and the polarization layer; or
the pressure-sensitive adhesive layer.

In some embodiments, on the light emitting side of the liquid crystal display panel, the display device only includes the polarizer;
the polarizer includes two haze layers, and the two haze layers are both disposed on the side of the polarization layer facing away from the liquid crystal display panel.

In some embodiments, the two haze layers are stacked on a side of the second protection layer facing away from the polarization layer.

In some embodiments, on the light emitting side of the liquid crystal display panel, the display device includes at least two polarizers;
the at least two polarizers include: a first polarizer and a second polarizer disposed in stacked;
the first polarizer is disposed on a side of the second polarizer facing away from the liquid crystal display panel;
the first polarizer comprises at least one of the at least two haze layers; and
the second polarizer comprises at least one of the at least two haze layers.

In some embodiments, the first polarizer includes:
a first haze layer, which is a pressure-sensitive adhesive layer disposed on a side of a first protection layer of the first polarizer facing away from a polarization layer of the first polarizer; and
the first polarizer and the second polarizer are bonded through the first haze layer.

In some embodiments, the second polarizer includes:
a second haze layer, which is a pressure-sensitive adhesive layer disposed on a side of a first protection layer of the second polarizer facing away from a polarization layer of the second polarizer; and
the second haze layer is disposed at a side of the polarization layer of the second polarizer close to the liquid crystal display panel.

In some embodiments, the second polarizer includes:
a second haze layer, which is a pressure-sensitive adhesive layer disposed on a side of a first protection layer of the second polarizer facing away from a polarization layer of the second polarizer;
the second haze layer is disposed at a side of the polarization layer of the second polarizer facing away from the liquid crystal display panel; and
the first polarizer and the second polarizer are bonded through the first haze layer and the second haze layer.

In some embodiments, the haze layer includes:
a pressure-sensitive adhesive; and
dispersed particles, at least dispersed in the pressure-sensitive adhesive.

In some embodiments, the dispersed particles at least include: first dispersed particles and second dispersed particles; and diameters of the second dispersed particles are greater than diameters of the first dispersed particles.

In some embodiments, the first dispersed particles are dispersed in the pressure-sensitive adhesive; and
at least part of the second dispersed particles are dispersed on a surface of the pressure-sensitive adhesive.

In some embodiments, a diameter of the dispersed particle ranges from 1 micrometer to 10 micrometers.

In some embodiments, a haze of the haze layer ranges from 50% to 70%.

In some embodiments, a gate signal line of the liquid crystal display panel is parallel with a gate signal line of the liquid crystal light control panel.

BRIEF DESCRIPTION OF THE DRAWINGS

In order to illustrate the technical solutions in the embodiments of the present disclosure more clearly, accompanying drawings needing to be used in description of the embodiments will be introduced below briefly. Obviously, the accompanying drawings in the following description are only some embodiments of the present disclosure, those skilled in the art can further obtain other accompanying drawings according to these accompanying drawings without inventive efforts.

DETAILED DESCRIPTION OF THE EMBODIMENTS

In order to make the objective, technical solutions and advantages of embodiments of the present disclosure clearer, the technical solutions of embodiments of the present disclosure will be described clearly and completely with reference to accompanying drawings of the embodiments of the present disclosure. Obviously, the described embodiments are part of embodiments of the present disclosure, but not all embodiments. Embodiments in the present disclosure and features in embodiments may be mutually combined in the case of no conflict. On the basis of the described embodiments of the present disclosure, all other embodiments obtained by those ordinarily skilled in the art without inventive efforts fall within the protection scope of the present disclosure.

Unless otherwise defined, the technical or scientific terms used in the present disclosure shall have the usual meanings understood by a person of ordinary skill in the art to which the present disclosure belongs. The words "first", "second" and the like used in the present disclosure do not indicate any order, quantity or importance, but are only used to distinguish different components. The word "comprise" or "include" and the like, means that an element or item preceding the word covers an element or item listed after the word and the equivalent thereof, without excluding other elements or items. The word "connection" or "coupling" and the like is not restricted to physical or mechanical connection, but may include electrical connection, whether direct or indirect.

It should be noted that sizes and shapes of all graphs in the accompanying drawings do not reflect the true scale, and only intend to illustrate the content of the present disclosure. The same or similar reference numbers represent the same or similar elements or elements with the same or similar functions from beginning to end.

Figure 1:
FIG. 1 is a schematic structural diagram of a display device provided by an embodiment of the present disclosure.

A display device provided by an embodiment of the present disclosure, as shown in FIG. 1, includes:

a liquid crystal display panel 8;

a liquid crystal light control panel 9, on a light incident side of the liquid crystal display panel 8; and at least two haze layers 5, on a light emitting side of the liquid crystal display panel 8.

The display device provided by an embodiment of the present disclosure, includes at least two haze layers, the haze layers can change a propagation direction of a passing ray, after a collimating and incident ray passes through the two haze layers, part of rays may disperse to other viewing angles, so that a moire condition of the display device can be relieved, and a display effect is improved.

In some embodiments, as shown in FIG. 1, the display device further includes:

a polarizer 15, on the light emitting side of the liquid crystal display panel 8.

In some embodiments, as shown in FIG. 1, the polarizer 15 includes:

a first protection layer 1;

a second protection layer 2, disposed opposite to the first protection layer 1;

a polarization layer 3, between the first protection layer 1 and the second protection layer 2; and a pressure-sensitive adhesive layer 4, disposed on a side of the first protection layer 1 facing away from the polarization layer 3.

In some embodiments, as shown in FIG. 1, at least one of the at least two haze layers is disposed on a side of the polarization layer facing away from the liquid crystal display panel.

In the display device provided by the embodiment of the present disclosure, at least one of the at least two haze layers is disposed on the side of the polarization layer facing away from the liquid crystal display panel, a situation that the haze layer generates a phase difference to affect a polarization layer direction of light can be avoided, so that a contrast ratio of the display device can be prevented from being affected, and the display effect of the display device can be improved.

In some embodiments, at least one of the at least two haze layers is one of: disposed on a side of the second protection layer facing away from the polarization layer; disposed between the second protection layer and the polarization layer; disposed between the first protection layer and the polarization layer; or the pressure-sensitive adhesive layer.

In some embodiments, when one polarizer located on the light emitting side of the liquid crystal display panel includes a haze layer, a set position of the haze layer may adopt following modes.

Figure 2:
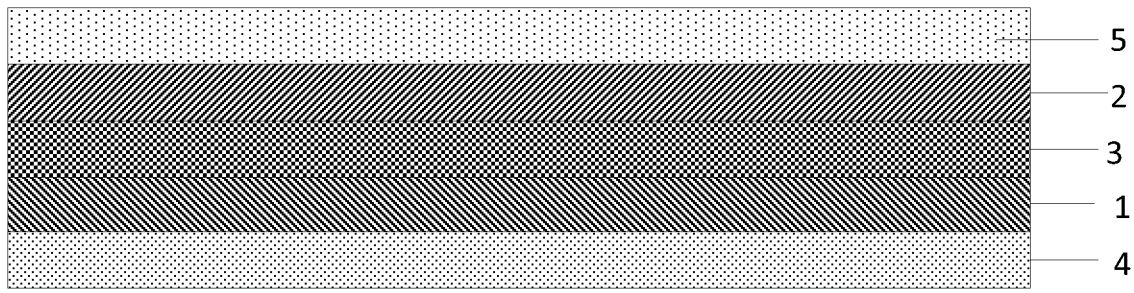
FIG. 2 is a schematic structural diagram of a polarizer in a display device provided by an embodiment of the present disclosure.

Mode One:

in some embodiments, as shown in FIG. 2, the haze layer 5 is disposed on a side of the second protection layer 2 facing away from the polarization layer 3.

Figure 3:
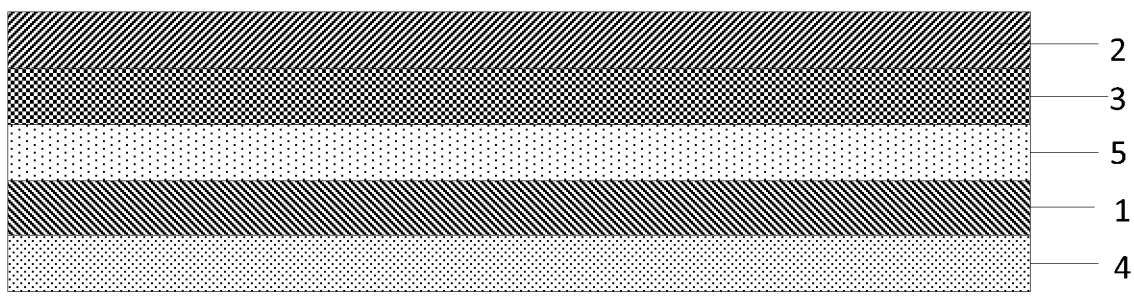
FIG. 3 is a schematic structural diagram of a polarizer in another display device provided by an embodiment of the present disclosure.

Mode Two:

in some embodiments, as shown in FIG. 3, the haze layer 5 is disposed between the first protection layer 1 and the polarization layer 3.

Figure 4:
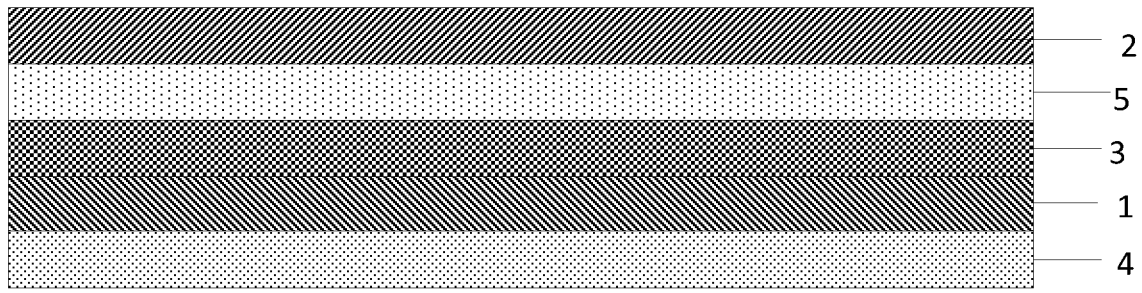
FIG. 4 is a schematic structural diagram of a polarizer in another display device provided by an embodiment of the present disclosure.

Mode Three:

in some embodiments, as shown in FIG. 4, the haze layer 5 is disposed between the second protection layer 2 and the polarization layer 3.

Figure 5:
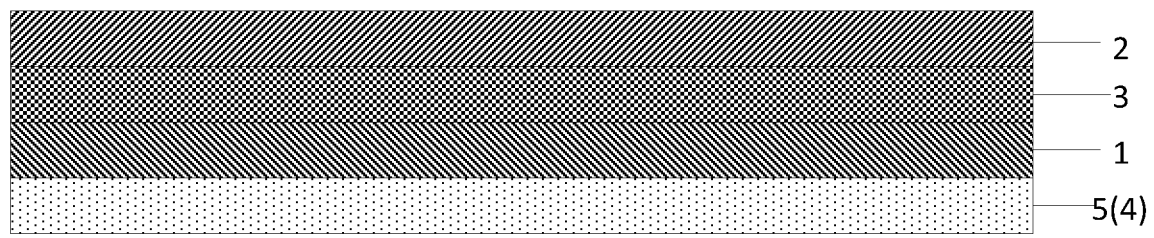
FIG. 5 is a schematic structural diagram of a polarizer in another display device provided by an embodiment of the present disclosure.

Mode Four:

in some embodiments, as shown in FIG. 5, the pressure-sensitive adhesive layer 4, located on a side of the first protection layer 1 facing away from the polarization layer 3, is the haze layer 5.

It needs to be illustrated that when one polarizer disposed on the light emitting side of the liquid crystal display panel includes a haze layer, at least one polarizer including the haze layer needs to be arranged on the light emitting side of the liquid crystal display panel, so as to ensure that the display device includes at least two haze layers on the light emitting side of the liquid crystal display panel.

Certainly, during some implementations, the at least one polarizer disposed on the light emitting side of the liquid crystal display panel may further include multiple haze layers to further improve moire problem.

In some embodiments, the at least one polarizer disposed on the light emitting side of the liquid crystal display panel may include two haze layers.

In some embodiments, the two haze layers in one polarizer are not adjacent, the haze layers are at least at any two of the following positions:

a side of the second protection layer facing away from the polarization layer, a position between the second protection layer and the polarization layer, and a position between the first protection layer and the polarization layer, or the pressure-sensitive adhesive layer, disposed on a side of the first protection layer facing away from the polarization layer, is the haze layer.

When one polarizer on the light emitting side of the liquid crystal display panel includes two nonadjacent haze layers, set positions of the haze layers may adopt the following modes.

Figure 6:
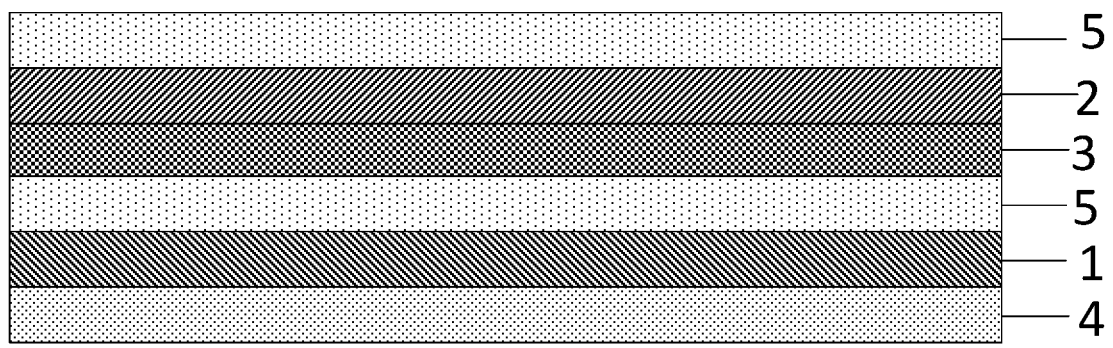
FIG. 6 is a schematic structural diagram of a polarizer in yet another display device provided by an embodiment of the present disclosure.

Mode Five:

in some embodiments, as shown in FIG. 6, the haze layers 5 are disposed on a side of the second protection layer 2 facing away from the polarization layer 3, and between the first protection layer 1 and the polarization layer 3.

Figure 7:
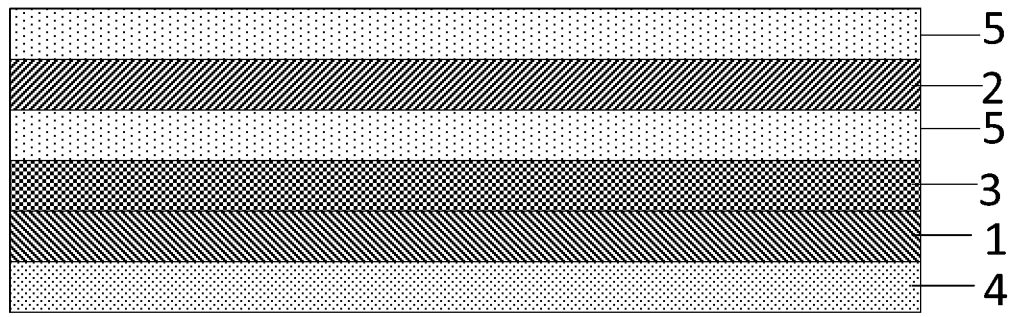
FIG. 7 is a schematic structural diagram of a polarizer in another display device provided by an embodiment of the present disclosure.

Mode Six:

in some embodiments, as shown in FIG. 7, the haze layers 5 are disposed on a side of the second protection layer 2 facing away from the polarization layer 3, and between the second protection layer 2 and the polarization layer 3.

Figure 8:
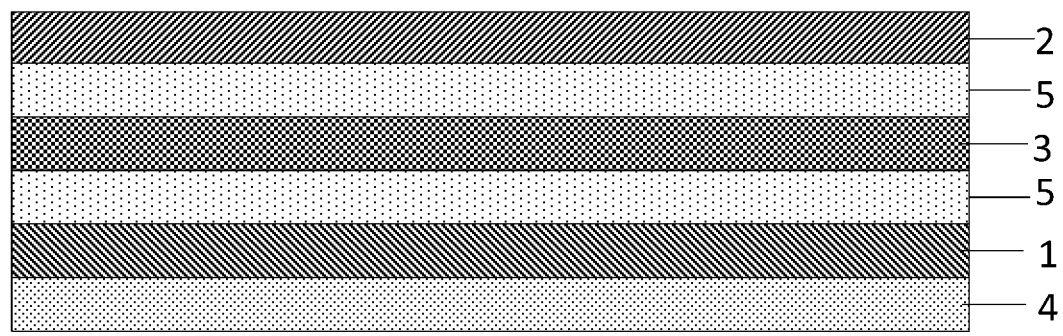
FIG. 8 is a schematic structural diagram of a polarizer in another display device provided by an embodiment of the present disclosure.

Mode Seven:

in some embodiments, as shown in FIG. 8, the haze layers 5 are disposed between the second protection layer 2 and the polarization layer 3, and between the first protection layer 1 and the polarization layer 3.

Figure 9:
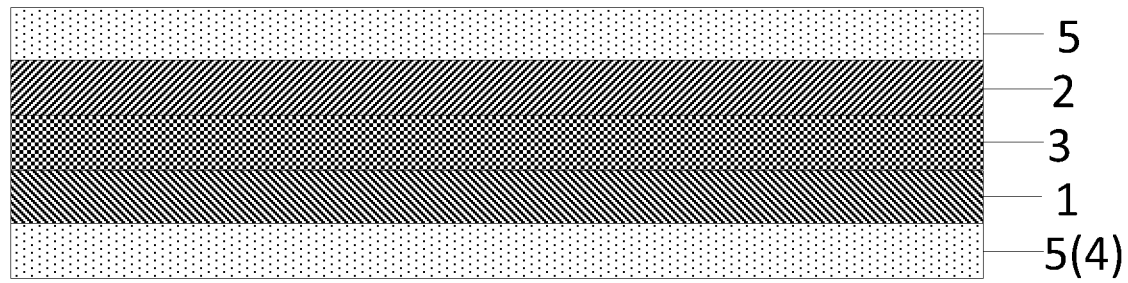
FIG. 9 is a schematic structural diagram of a polarizer in another display device provided by an embodiment of the present disclosure.

Mode Eight:

in some embodiments, as shown in FIG. 9, one of the haze layers 5 is disposed on a side of the second protection layer 2 facing away from the polarization layer 3, and the other haze layer 5 is the pressure-sensitive adhesive 4 disposed on a side of the first protection layer 1 facing away from the polarization layer 3.

Figure 10:
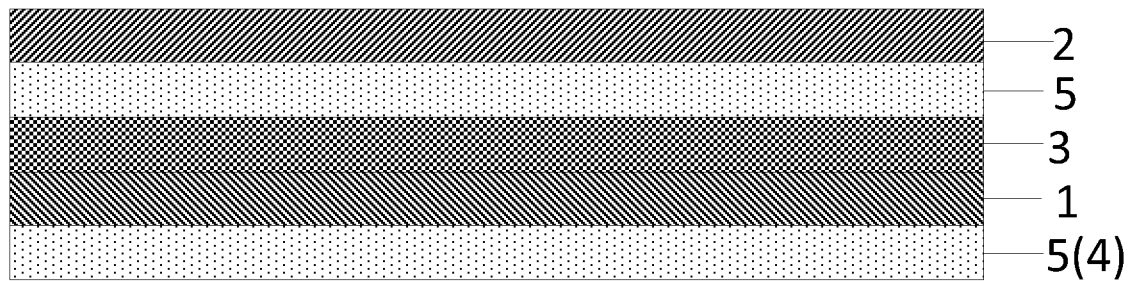
FIG. 10 is a schematic structural diagram of a polarizer in another display device provided by an embodiment of the present disclosure.

Mode Nine:

in some embodiments, as shown in FIG. 10, one of the haze layers 5 is disposed between the second protection layer 2 and the polarization layer 3, and the other haze layer 5 is the pressure-sensitive adhesive 4 disposed on a side of the first protection layer 1 facing away from the polarization layer 3.

Figure 11:
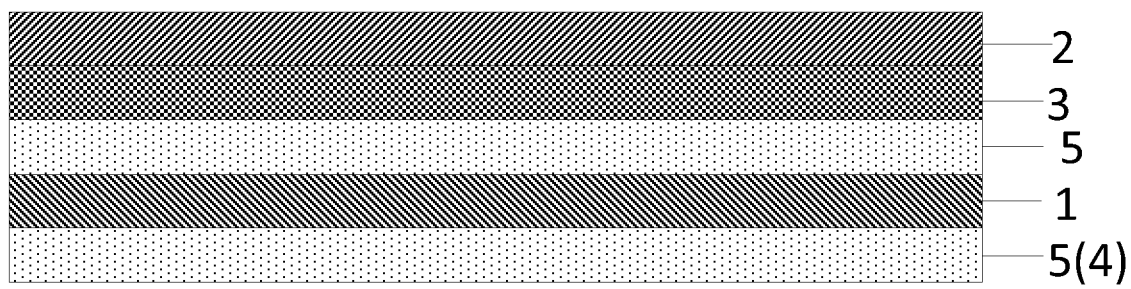
FIG. 11 is a schematic structural diagram of a polarizer in another display device provided by an embodiment of the present disclosure.

Mode Ten:

in some embodiments, as shown in FIG. 11, one of the haze layers 5 is disposed between the first protection layer 1 and the polarization layer 3, and the other haze layer 5 is the pressure-sensitive adhesive 4 disposed on a side of the first protection layer 1 facing away from the polarization layer 3.

Certainly, in some embodiments, the two haze layers may also be adjacent, that is, the two haze layers are stacked at any one of the following positions: a side of the second protection layer facing away from the polarization layer, a position between the second protection layer and the polarization layer, and a position between the first protection layer and the polarization layer, or the pressure-sensitive adhesive layer, located on a side of the first protection layer facing away from the polarization layer, is the haze layer. That is, single-layer haze layers in FIG. 2 to FIG. 5 may be replaced with two stacked haze layers.

It needs to be illustrated that for the polarizer provided by an embodiment of the present disclosure as shown in FIG. 2 to FIG. 11, the first protection layer disposed below the polarization layer is taken as an example for illustration, during some implementations, a certain polarizer may further be arranged in the display device again after being overturned compared with FIG. 2 to FIG. 11.

It needs to be illustrated that when one polarizer disposed on the light emitting side of the liquid crystal display panel includes two haze layers, in the display device, the light emitting side of the liquid crystal display panel may only include one polarizer, certainly, in the display device, the light emitting side of the liquid crystal display panel may further include other polarizers.

In some embodiments, as shown in FIG. 1, on the light emitting side of the liquid crystal display panel 8, the display device only includes one polarizer 15; and the polarizer 15 includes two haze layers 5, and the two haze layers 5 are both disposed on the side of the polarization layer 3 facing away from the liquid crystal display panel 8.

In some embodiments, as shown in FIG. 1, the two haze layers 5 are stacked on a side of the second protection layer 2 facing away from the polarization layer 3.

The display device provided by the embodiment of the present disclosure, on the light emitting side of the liquid crystal display panel, the display device includes a polarizer, which can avoid excess thicknesses of the display device. The polarizer includes the two haze layers stacked on the side of the polarization layer facing away from the liquid crystal display panel, the two haze layers are arranged to further improve the moire problem, the two haze layers are disposed on the side of the polarization layer facing away from the liquid crystal display panel, the situation that the polarization direction of light is affected by the phase difference generated by the haze layer can further be avoided, so that the contrast ratio of the display device can further be prevented from being affected, and the display effect of the display device can be improved.

Certainly, in some embodiments, when the second protection layer is disposed on the side of the polarization layer facing away from the liquid crystal display panel, the two haze layers may further be disposed between the second protection layer and the polarization layer.

In some embodiments, on the light emitting side of the liquid crystal display panel, the display device includes at least two polarizers.

Figure 12:
FIG. 12 is a schematic structural diagram of another display device provided by an embodiment of the present disclosure.
Figure 13:
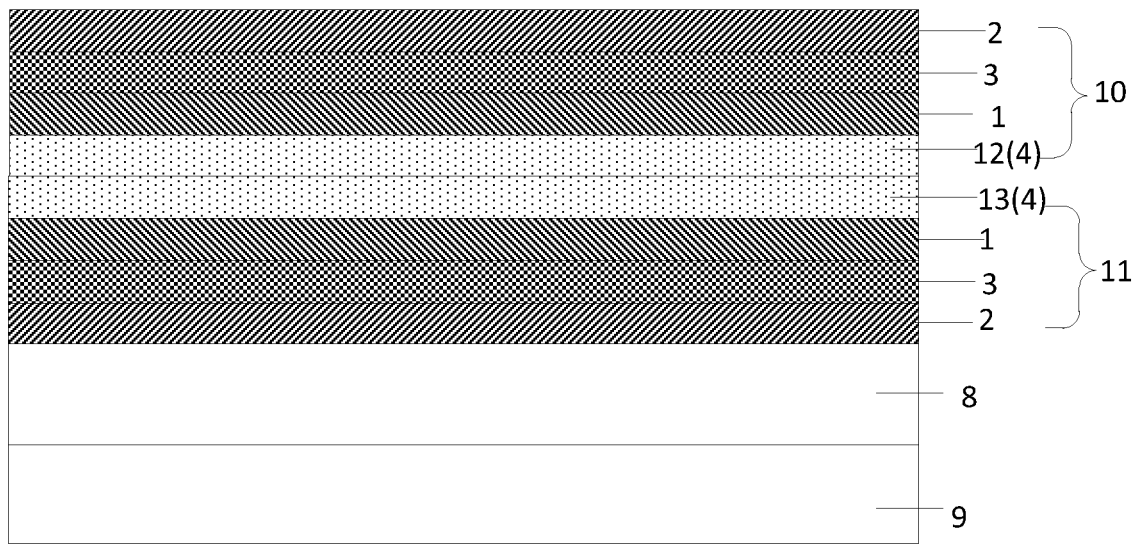
FIG. 13 is a schematic structural diagram of another display device provided by an embodiment of the present disclosure.

In some embodiments, as shown in FIG. 12 and FIG. 13, the at least two polarizers include a first polarizer 10 and a second polarizer 11 disposed in stacked;

the first polarizer 10 is disposed on the side of the second polarizer 11 facing away from the liquid crystal display panel;

the first stacked polarizer 10 includes at least one of the at least two haze layers; and the second stacked polarizer 11 includes at least one of the at least two haze layers.

The display device provided by the embodiment of the present disclosure, on the light emitting side of the liquid crystal display panel, includes at least two polarizers, the two polarizers each includes the haze layer, so that the propagation direction of rays may further be dispersed, the moire can further be relieved and removed, and the display effect is improved.

In some embodiments, as shown in FIG. 12 and FIG. 13, the first polarizer 10 includes:

a first haze layer 12, which is a pressure-sensitive adhesive layer 4, disposed on a side of the first protection layer 1 of the first polarizer 10 facing away from the polarization layer 3 of the first polarizer 10; and the first polarizer 10 and the second polarizer 11 are bonded through the first haze layer.

In some embodiments, as shown in FIG. 12, the second polarizer 11 includes:

a second haze layer 13, which is a the pressure-sensitive adhesive layer 4, disposed on the side of the first protection layer 1 of the second polarizer 11 facing away from the polarization layer 3 of the second polarizer 11, and the second haze layer 13 is disposed at the side of the polarization layer 3 of the second polarizer 11 close to the liquid crystal display panel 8.

In some embodiments, as shown in FIG. 13, the second polarizer 11 includes:

a second haze layer 13, which is a pressure-sensitive adhesive layer 4 disposed on the side of the first protection layer 1 of the second polarizer 11 facing away from the polarization layer 3 of the second polarizer 11, and the second haze layer 13 is disposed at the side of the polarization layer 3 of the second polarizer 11 facing away from the liquid crystal display panel 8; and the first polarizer 10 and the second polarizer 11 are bonded through the first haze layer 12 and the second haze layer 13.

The display device provided by the embodiment of the present disclosure, as shown in FIG. 12 and FIG. 13, takes an example that the first polarizer and the second polarizer each includes a haze layer for illustration. Certainly, during implementation, the quantity of haze layers in different polarizers may be the same or different. When the quantity of the haze layers in different polarizers is the same, positions of the haze layers in different polarizers may be the same or different.

In some embodiments, the haze layers include:

a pressure-sensitive adhesive; and dispersed particles, at least dispersed in the pressure-sensitive adhesive.

In the display device provided by the embodiment of the present disclosure, the haze layers include the pressure-sensitive adhesive and the dispersed particles, so that the haze layers can play a role of adhering to adjacent film layers while disperse the propagation direction of the rays. Glue materials do not need to be additionally arranged to paste the haze layers to the adjacent film layers, a structure of the display device can further be simplified, and costs are saved.

According to the display device provided by the embodiment of the present disclosure, when the pressure-sensitive adhesive of the first protection layer facing away from the polarization layer is the haze layer, the dispersed particles are added in the pressure-sensitive adhesive in the polarizer, a thickness of the polarizer can be reduced, the structure of the display device can further be simplified, and the costs are saved.

When the display device provided by the embodiment of the present disclosure includes the first polarizer and the second polarizer, the first polarizer and the second polarizer are bonded through the first haze layer, since the first haze layer has the dispersed particles, the pressure-sensitive adhesive added with the dispersed particles can increase viscosity, is easier to be attached to the adjacent film layers, that is, the pressure-sensitive adhesive is utilized to directly attach the two adjacent polarizers more easily, and binder materials for attaching the two layers of polarizers do not need to be arranged additionally.

In some embodiments, all the haze layers may each include glue materials and dispersed particles. Certainly, during implementation, the haze layers may further adopt other arrangement modes.

In some embodiments, the dispersed particles at least include first dispersed particles and second dispersed particles; and diameters of the second dispersed particles are greater than diameters of the first dispersed particles.

According to the display device provided by the embodiment of the present disclosure, the haze layers at least include two kinds of dispersed particles with different diameters, so that the propagation direction of the rays can be dispersed more effectively, the moire problem is further alleviated, and the display effect is improved.

In some embodiments, the first dispersed particles are dispersed in the pressure-sensitive adhesive; and the at least part of the second dispersed particles are dispersed on a surface of the pressure-sensitive adhesive.

In some embodiments, a diameter the dispersed particle ranges from 1 micrometer to 10 micrometers.

In the display device provided by the embodiment of the present disclosure, the diameter of the dispersed particles ranges from 1 micrometer to 10 micrometers, that is, the diameters of the dispersed particles are smaller, and when the dispersed particles are dispersed on the pressure-sensitive adhesives, viscosity of the haze layers can be increased.

In some embodiments, in the display panel provided by the embodiment of the present disclosure, the haze of the haze layer ranges from 50% to 70%.

In some embodiments, when the polarizer includes a haze layer, the haze of the haze layer is 55%.

In some embodiments, when the polarizer includes two stacked haze layers, the haze of the haze layers is 65%.

Figure 14:
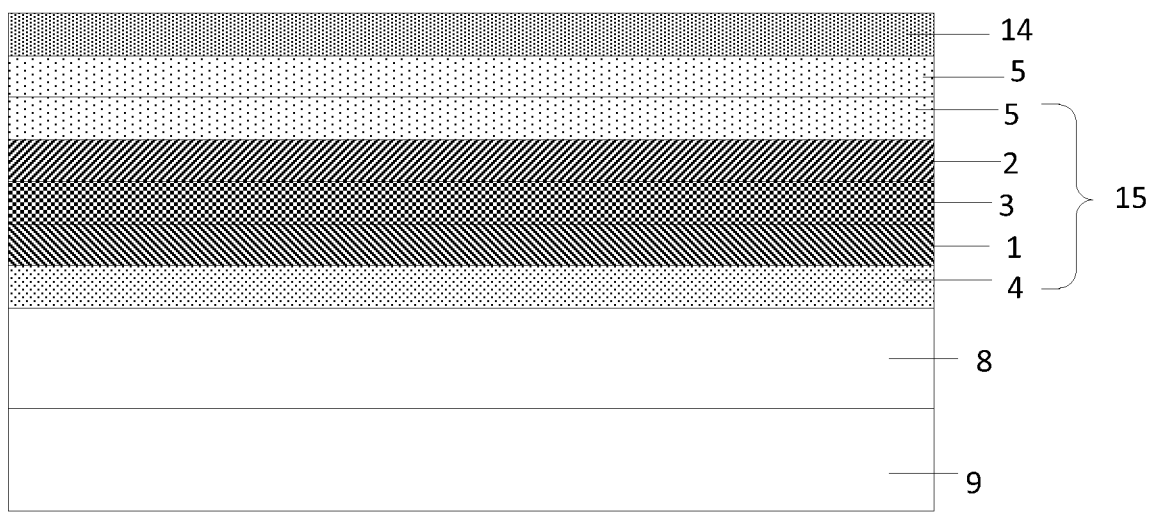
FIG. 14 is a schematic structural diagram of another display device provided by an embodiment of the present disclosure.
Figure 15:
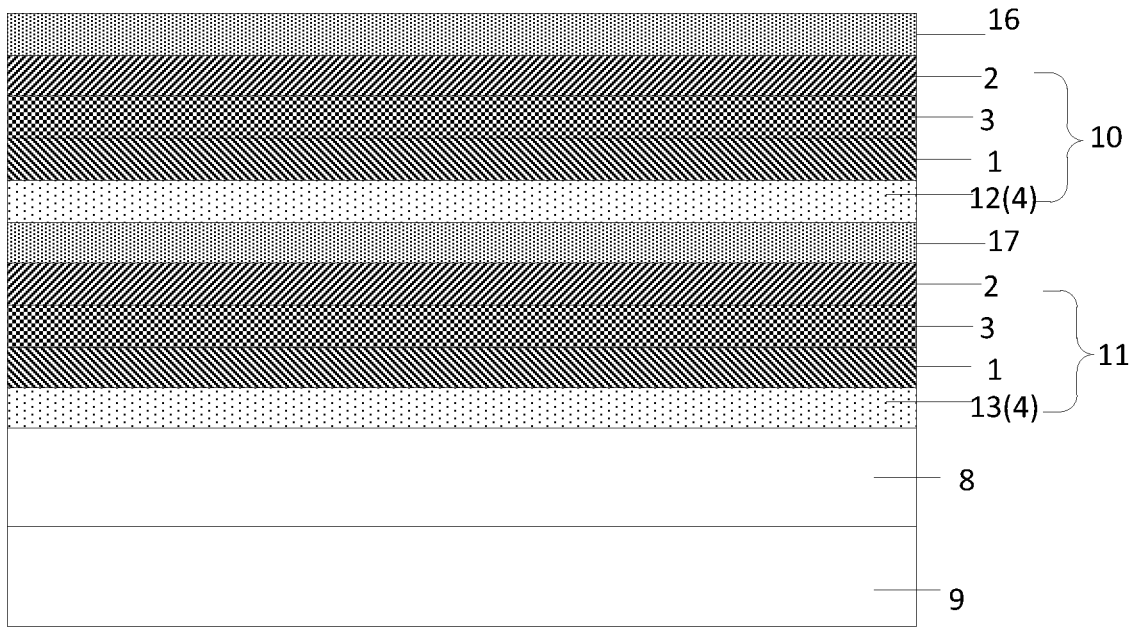
FIG. 15 is a schematic structural diagram of another display device provided by an embodiment of the present disclosure.
Figure 16:
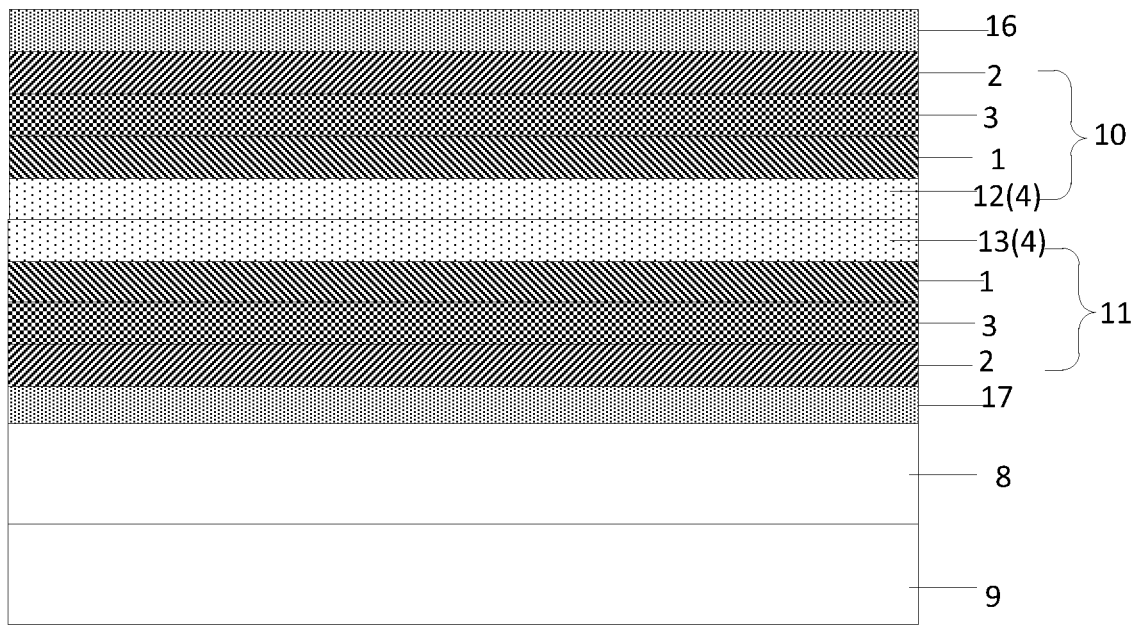
FIG. 16 is a schematic structural diagram of another display device provided by an embodiment of the present disclosure.

In some embodiments, as shown in FIG. 14 to FIG. 16, the display device further includes an anti-glare reflecting layer 14 (AGLR) attached to the surface of the polarizer 15.

In some embodiments, as shown in FIG. 14, the light emitting side of the liquid crystal display panel 8 only includes a polarizer 15, the polarizer 15 includes two haze layers 5 stacked on one side of the second protection layer 2 away from the polarization layer 3, and the AGLR 14 is located on one side of the topside haze layer 5 away from the second protection layer 2.

In some embodiments, as shown in FIG. 15, the display device includes: a first anti-glare reflecting layer 16 and a second anti-glare reflecting layer 17, the first anti-glare reflecting layer 16 is disposed on the side of the second protection layer 2 of the first polarizer 10 facing away from the liquid crystal display panel 8, and the second anti-glare reflecting layer 17 is disposed on the side of the second protection layer 2 of the second polarizer 11 facing away from the liquid crystal display panel 8.

In some embodiments, as shown in FIG. 16, the display device includes: the first anti-glare reflecting layer 16 and the second anti-glare reflecting layer 17, the first anti-glare reflecting layer 16 is disposed on one side of the second protection layer 2 of the first polarizer 10 facing away from the liquid crystal display panel 8, and the second anti-glare reflecting layer 17 is disposed on one side of the second protection layer 2 of the second polarizer 11 close to the liquid crystal display panel 8.

In some embodiments, the AGLR is a film layer with haze. That is, haze processing may be performed on the AGLR, for example, the haze of the AGLR is 1%.

In some embodiments, materials of the first protection layer and the second protection layer include one or a combination of the following: polyethylene terephthalate (PET), acrylic, cyclo olefin polymer (COP), and triacetyl cellulose (TAC). In some embodiments, TAC, for example, may be no retardation tac (NRT). In some embodiments, materials of the polarization layer include: polyvinyl alcohol (PVA). PET is one of resin.

In some embodiments, materials of the first protection layer and materials of the second protection layer are the same.

In some embodiments, a gate signal line of the liquid crystal display panel is parallel with a gate signal line of the liquid crystal light control panel.

It needs to be illustrated that the liquid crystal display panel and the liquid crystal light control panel each includes metal layers. In the related art, the moire is relieved through difference of patterns of the metal layers of the liquid crystal display panel and the liquid crystal light control panel. That is, the metal layer of the liquid crystal display panel and the metal layer of the liquid crystal light control panel adopt different masks for manufacturing, and preparation costs of the display device are increased.

In some embodiments, the display device provided by the embodiment of the present disclosure includes at least two haze layers, so that a morie problem can be solved. The metal layers with the same function in the liquid crystal display panel and the liquid crystal light control panel may be designed into the same or similar patterns. Thus, the same masks may be adopted when the metal layers with the same function of the liquid crystal display panel and the liquid crystal light control panel are prepared, and the preparation costs of the display device can be saved. For example, the gate signal line of the liquid crystal display panel is parallel to the gate signal line of the liquid crystal light control panel, so that the liquid crystal display panel and the liquid crystal light control panel may adopt the same masks to prepare the gate signal line.

In some embodiments, the liquid crystal display panel includes: a first array substrate and a first opposite substrate which are arranged oppositely, and a liquid crystal layer between the first array substrate and the first opposite substrate.

In some embodiments, the first opposite substrate is a color film substrate, and includes: a substrate, a black matrix (BM), a color resist, an organic coating (OC) and a partitioning spacer (PS).

In some embodiments, the liquid crystal light control panel includes: a second array substrate and a second opposite substrate which are arranged oppositely, and a liquid crystal layer between the second array substrate and the second opposite substrate. The second opposite substrate does not need to arrange a color resist.

In some embodiments, the second opposite substrate includes: a substrate, a BM, an OC and a PS.

In some embodiments, the second opposite substrate includes: a substrate and a PS.

In some embodiments, the display device only includes a polarizer located on the light emitting side of the liquid crystal display panel.

In some embodiments, except the polarizer disposed on the light emitting side of the liquid crystal display panel, the liquid crystal display panel further includes a third polarizer. The third polarizer is disposed between the liquid crystal display panel and the liquid crystal light control panel, or the third polarizer is disposed on one side of the liquid crystal light control panel away from the liquid crystal display panel.

In some embodiments, except the polarizer disposed on the light emitting side of the liquid crystal display panel, the display panel further includes a third polarizer and a fourth polarizer. The third polarizer is disposed between the liquid crystal display panel and the liquid crystal light control panel, and the fourth polarizer is disposed on one side of the liquid crystal light control panel facing away from the liquid crystal display panel.

In some embodiments, except the polarizer disposed on the light emitting side of the liquid crystal display panel, the display panel further includes a third polarizer, a fourth polarizer and a fifth polarizer. The third polarizer is disposed between the liquid crystal display panel and the liquid crystal light control panel, the fourth polarizer is disposed on one side of the liquid crystal light control panel facing away from the liquid crystal display panel, and the fifth polarizer is disposed between the third polarizer and the liquid crystal light control panel.

Next, conditions of the polarizers relieving the moire in a part of the display device provided by the embodiment of the present disclosure are introduced. Structures of the following polarizers are simulated.

Structure A: two stacked polarizers are included, each polarizer includes a haze layer, and a pressure-sensitive adhesive, located on one side of the first protection layer, is a haze layer. An AGLR disposed on one side of the second protection layer facing away from the polarization layer is further included. The haze of the AGLR is 1%, and the haze of the haze layer is 55%. In each polarizer, materials of the second protection layer are PET, materials of the polarization layer are PVA, and materials of the first protection layer are NRT. The structure A, for example, may be a structure formed by a first polarizer 10, a second polarizer 11, a first anti-glare reflecting layer 16 and a second anti-glare reflecting layer 17 in the display device as shown in FIG. 15 provided by the embodiment of the present disclosure.

Figure 17:
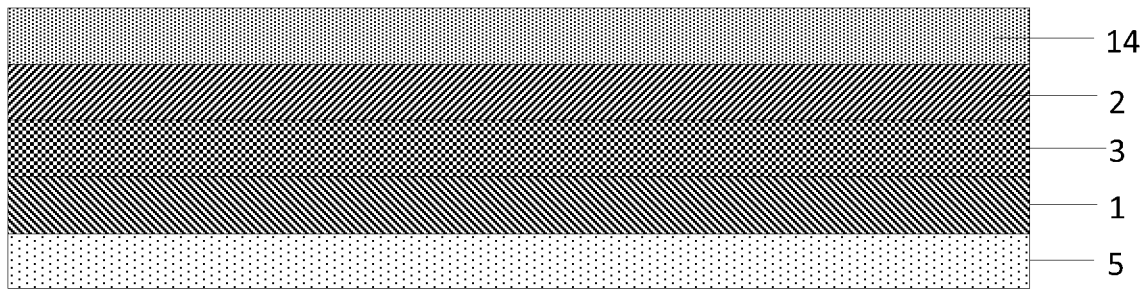
FIG. 17 is a schematic structural diagram of a polarizer provided by an embodiment of the present disclosure.

Structure B: as shown in FIG. 17, one polarizer is included, the polarizer includes a haze layer 5, and the pressure-sensitive adhesive 4, disposed on one side of the first protection layer 1 facing away from the polarization layer 3, is the haze layer 5. An AGLR 14 disposed on one side of the second protection layer 2 facing away from the polarization layer is further included. The haze of the AGLR is 40%, and the haze of the haze layer is 55%. Materials of the second protection layer are PET, materials of the polarization layer are PVA, and materials of the first protection layer are NRT.

Structure C: as shown in FIG. 17, one polarizer is included, the polarizer includes a haze layer 5, and the pressure-sensitive adhesive 4, disposed on one side of the first protection layer 1 facing away from the polarization layer 3, is the haze layer 5. An AGLR 14 disposed on one side of the second protection layer 2 facing away from the polarization layer is further included. The haze of the AGLR is 1%, and the haze of the haze layer is 55%. Materials of the second protection layer are PET, materials of the polarization layer are PVA, and materials of the first protection layer are NRT.

Structure D: two stacked polarizers are included, each polarizer includes a haze layer, and the pressure-sensitive adhesive, disposed on one side of the first protection layer facing away from the polarization layer, is the haze layer in each polarizer. Each polarizer further includes an AGLR disposed on one side of the second protection layer facing away from the polarization layer. The haze of the AGLR is 1%, and the haze of the haze layer in each layer of polarizer is 55%. The haze layer in the upper layer of polarizer is attached to the haze layer in the lower polarizer. In each polarizer, materials of the second protection layer are PET, materials of the polarization layer are PVA, and materials of the first protection layer are NRT. The structure D, for example, may be a structure formed by a first polarizer 10, a second polarizer 11, a first anti-glare reflecting layer 16 and a second anti-glare reflecting layer 17 in the display device as shown in FIG. 16 provided by the embodiment of the present disclosure.

Figure 18:
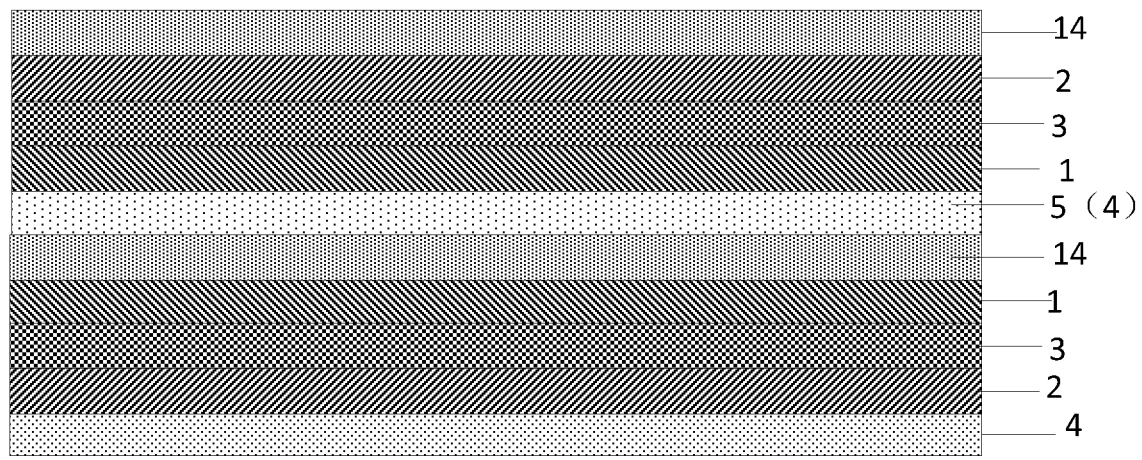
FIG. 18 is a schematic structural diagram of another polarizer provided by an embodiment of the present disclosure.

Structure E: as shown in FIG. 18, two stacked polarizers are included. The upper layer of polarizer includes a haze layer 5, the pressure-sensitive adhesive 4, disposed on one side of the first protection layer 1 facing away from the polarization layer 3, is the haze layer 5, and an AGLR 14 disposed on one side of the second protection layer 2 facing away from the polarization layer 3 is further included. The lower layer of polarizer does not include a haze layer, and the AGLR 14 is disposed on one side of the second protection layer 2 facing away from the polarization layer 3. The haze of the AGLR in the upper layer of polarizer is 1%, and the haze of the haze layer is 55%. The haze of the AGLR in the lower layer of polarizer is 25%. In each polarizer, materials of the polarization layer are PVA, and materials of the first protection layer are NRT. Materials of the second protection layer in the upper layer of polarizer are PET. Materials of the second protection layer in the lower layer of polarizer are TAC.

Figure 19:
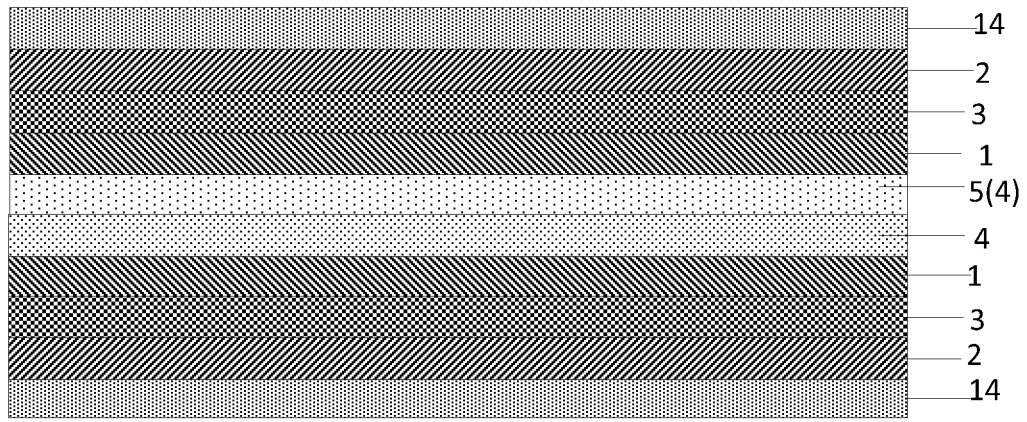
FIG. 19 is a schematic structural diagram of another polarizer provided by an embodiment of the present disclosure.

Structure F: as shown in FIG. 19, two stacked polarizers are included. The upper layer of polarizer includes a haze layer 5, the pressure-sensitive adhesive 4, disposed on one side of the first protection layer 1 facing away from the polarization layer 3, is the haze layer 5, and an AGLR 14 disposed on one side of the second protection layer 2 facing away from the polarization layer 3 is further included. The lower layer of polarizer does not include a haze layer, and the AGLR 14 is disposed on one side of the second protection layer 2 facing away from the polarization layer 3. The haze layer in the upper layer of polarizer is attached to the pressure-sensitive adhesive in the lower layer of polarizer. The haze of the AGLR in the upper layer of polarizer is 1%, and the haze of the haze layer is 55%. The haze of the AGLR in the lower layer of polarizer is 25%. In each polarizer, materials of the polarization layer are PVA, and materials of the first protection layer are NRT. Materials of the second protection layer in the upper layer of polarizer are PET. Materials of the second protection layer in the lower layer of polarizer are TAC.

Simulated results of the structures A-F are shown in table one:

TABLE 1

| Structure | Moire score | contrast ratio | L255 | L0 |
|---|---|---|---|---|
| A | 100 | 100% | 68.4 | 0.0018 |
| B | 60 | 128% | 83 | 0.0017 |
| C | 40 | 140% | 95.6 | 0.0018 |
| D | 90 | 38% | 53 | 0.0037 |
| E | 40 | 188% | 71.3 | 0.001 |
| F | 50 | 82% | 62.4 | 0.002 |

The higher the moire score is, the weaker the moire image is and the better the display effect is. As shown in Table 1, the higher the moire score in the structure A is, the better the condition of using the structure to relieve the moire.

The display device provided by the embodiment of the present disclosure is a mobile phone, a tablet computer, a television, a display, a laptop, a digital photo frame, a navigator and any products or components having display functions. Other essential components of the display device are understood by ordinary technical staff in the field and will not be described herein and will not be constructed as a limitation on the present disclosure.

In conclusion, the display device provided by the embodiment of the present disclosure includes at least two haze layers, the haze layers can change the propagation direction of passing rays, after the collimated and incident rays pass through the two haze layers, part of the rays can disperse to other viewing angles, so that the moire condition of the display device can be relieved, and the display effect is improved.

Apparently, those skilled in the art can make various modifications and variations to the embodiments of the present disclosure without departing from the spirit and scope of the present disclosure. In this case, if these modifications and variations of the present disclosure fall within the scope of the claims and their equivalents, the present disclosure is also intended to cover such modifications and variations.

What is claimed is:
1. A display device, comprising:
   a liquid crystal display panel;
   a liquid crystal light control panel, on a light incident side of the liquid crystal display panel; and at least two haze layers, on a light emitting side of the liquid crystal display panel;

at least two polarizers, on the light emitting side of the liquid crystal display panel;

wherein the at least two polarizers comprise: a first polarizer and a second polarizer disposed in stacked;

the first polarizer is disposed on a side of the second polarizer facing away from the liquid crystal display panel;

wherein both of the first polarizer and the second polarizer comprise:

a first protection layer;

a second protection layer, disposed opposite to the first protection layer;

a polarization layer, between the first protection layer and the second protection layer; and a pressure-sensitive adhesive layer, disposed on a side of the first protection layer facing away from the polarization layer;

wherein the first polarizer comprises one of the at least two haze layers; and the second polarizer comprises another of the at least two haze layers; and at least one of the at least two haze layers, disposed on a side of the polarization layer of the second polarizer facing away from the liquid crystal display panel.

2. The display device according to claim 1, wherein the first polarizer comprises:

a first haze layer, which is the pressure-sensitive adhesive layer of the first polarizer disposed on a side of the first protection layer of the first polarizer facing away from the polarization layer of the first polarizer; and the first polarizer and the second polarizer are bonded through the first haze layer.

3. The display device according to claim 2, wherein the second polarizer comprises:

a second haze layer, which is the pressure-sensitive adhesive layer of the second polarizer disposed on a side of the first protection layer of the second polarizer facing away from the polarization layer of the second polarizer; and the second haze layer is disposed at a side of the polarization layer of the second polarizer close to the liquid crystal display panel.

4. The display device according to claim 2, wherein the second polarizer comprises:

a second haze layer, which is the pressure-sensitive adhesive layer of the second polarizer disposed on a side of the first protection layer of the second polarizer facing away from the polarization layer of the second polarizer;

the second haze layer is disposed at a side of the polarization layer of the second polarizer facing away from the liquid crystal display panel; and the first polarizer and the second polarizer are bonded through the first haze layer and the second haze layer.

5. The display device according to claim 1, wherein one of the at least two haze layers comprises:

a pressure-sensitive adhesive; and dispersed particles, at least dispersed in the pressure-sensitive adhesive.

6. The display device according to claim 5, wherein the dispersed particles at least comprise: first dispersed particles and second dispersed particles; and diameters of the second dispersed particles are greater than diameters of the first dispersed particles.

7. The display device according to claim 6, wherein the first dispersed particles are dispersed in the pressure-sensitive adhesive; and at least part of the second dispersed particles are dispersed on a surface of the pressure-sensitive adhesive.

8. The display device according to claim 5, wherein a diameter of the dispersed particle ranges from 1 micrometer to 10 micrometers.

9. The display device according to claim 5, wherein a haze of the haze layer ranges from 50% to 70%.

10. The display device according to claim 1, wherein a gate signal line of the liquid crystal display panel is parallel with a gate signal line of the liquid crystal light control panel.

11. The display device according to claim 1, wherein the display device further comprises: a first anti-glare reflecting layer and a second anti-glare reflecting layer;

the first anti-glare reflecting layer is disposed on a side of the second protection layer of the first polarizer facing away from the liquid crystal display panel; and the second anti-glare reflecting layer is disposed on a side of the second protection layer of the second polarizer facing away from the liquid crystal display panel.

12. The display device according to claim 1, wherein the display device further comprises: a first anti-glare reflecting layer and a second anti-glare reflecting layer;

the first anti-glare reflecting layer is disposed on a side of the second protection layer of the first polarizer facing away from the liquid crystal display panel; and the second anti-glare reflecting layer is disposed on a side of the second protection layer of the second polarizer close to the liquid crystal display panel.

13. The display device according to claim 1, wherein a material of the first protection layer comprises at least one of: polyethylene terephthalate, acrylic, cyclo olefin polymer, or triacetyl cellulose.

14. The display device according to claim 1, wherein a material of the second protection layer comprises at least one of: polyethylene terephthalate, acrylic, cyclo olefin polymer, or triacetyl cellulose.

15. The display device according to claim 1, wherein a material of the first protection layer and a material of the second protection layer are a same.

* * * * *